US009719649B2

(12) United States Patent
Wintzer et al.

(10) Patent No.: US 9,719,649 B2
(45) Date of Patent: Aug. 1, 2017

(54) HEADLIGHT LENS FOR A VEHICLE HEADLIGHT

(71) Applicant: DOCTER OPTICS SE, Neustadt an der Orla (DE)

(72) Inventors: Wolfram Wintzer, Jena (DE); Hans Scheibner, Neustadt (DE); Mohsen Mozaffari, Gera (DE)

(73) Assignee: Docter Optics SE, Neustadt an der Orla (DE)

( * ) Notice: Subject to any disclaimer, the term of this patent is extended or adjusted under 35 U.S.C. 154(b) by 238 days.

(21) Appl. No.: 14/648,097

(22) PCT Filed: Nov. 10, 2013

(86) PCT No.: PCT/EP2013/003384
§ 371 (c)(1),
(2) Date: May 28, 2015

(87) PCT Pub. No.: WO2014/114308
PCT Pub. Date: Jul. 31, 2014

(65) Prior Publication Data
US 2015/0292701 A1  Oct. 15, 2015

(30) Foreign Application Priority Data

Jan. 23, 2013 (DE) .................. 10 2013 001 075
Feb. 28, 2013 (DE) .................. 10 2013 003 324

(51) Int. Cl.
*B60Q 1/00* (2006.01)
*F21S 8/10* (2006.01)
*G02B 3/08* (2006.01)

(52) U.S. Cl.
CPC ....... *F21S 48/1291* (2013.01); *F21S 48/1159* (2013.01); *F21S 48/1241* (2013.01); *G02B 3/08* (2013.01)

(58) Field of Classification Search
CPC ............... F21S 48/1159; F21S 48/1291; F21S 48/1275; F21S 48/1241
See application file for complete search history.

(56) References Cited

U.S. PATENT DOCUMENTS 6,056,426 A    5/2000  Jenkins
7,073,931 B2 * 7/2006  Ishida .................. F21S 48/1154
                                                              257/E33.059

(Continued)

FOREIGN PATENT DOCUMENTS

DE    10302969    8/2004
DE    10315131    10/2004

(Continued)

OTHER PUBLICATIONS

English Translation, JP 10-119637, May 12, 1198.*

(Continued)

*Primary Examiner* — Peggy Neils
(74) *Attorney, Agent, or Firm* — Barnes & Thornburg LLP

(57) ABSTRACT

Techniques for encoded data processing which allow for continuous data processing as encoded data changes. Data is decomposed into one or more blocks with each block containing at least one data record. At least one data record within a given block is encoded with a first encoding process selected from one or more encoding processes. The first encoding process is associated with the given data block. Techniques evaluate whether or not to implement an encoding change for a given block when updating a given data record in the given block. Responsive to the evaluation, the given block is re-encoded with a second encoding process. Responsive to the re-encoding, the association of the given block is updated. A map is formed to convert the given data record encoded with the first encoding process to the second (Continued)

encoding process so as to preserve comparative relationships of the given data record.

27 Claims, 8 Drawing Sheets

(56) References Cited

U.S. PATENT DOCUMENTS

| | | | | |
|---|---|---|---|---|
| 7,810,975 | B2 * | 10/2010 | Specht | F21S 48/1241 362/511 |
| 2006/0087860 | A1 | 4/2006 | Ishida | |
| 2007/0024971 | A1 * | 2/2007 | Cassarly | G02B 6/0008 359/485.03 |
| 2013/0063960 | A1 * | 3/2013 | Nakano | F21S 48/1109 362/516 |

FOREIGN PATENT DOCUMENTS

| | | | |
|---|---|---|---|
| DE | 102005009556 | | 9/2005 |
| DE | 102005017528 | | 3/2006 |
| DE | 102004043706 | | 4/2006 |
| DE | 102008023551 | | 11/2009 |
| DE | 102011118270 | | 6/2012 |
| EP | 1514148 | | 3/2005 |
| EP | 1630576 | | 3/2006 |
| JP | 10-119637 | * | 5/1998 ............... F21V 5/04 |
| WO | 2009109209 | | 9/2009 |
| WO | 2012072188 | | 6/2012 |
| WO | 2012072191 | | 6/2012 |
| WO | 2012072192 | | 6/2012 |
| WO | 2012072193 | | 6/2012 |

OTHER PUBLICATIONS

Office Action issued on Oct. 14, 2013 in German Application No. 102013001075.6.
International Search Report and Written Opinion, Application No. PCT/EP2013/003384, dated Jul. 7, 2014.
International Preliminary Report on Patentability, Application No. PCT/EP2013/003384, dated Jul. 28, 2015.
English translation of International Preliminary Report on Patentability, Application No. PCT/EP2013/003384, dated Jul. 28, 2015.

* cited by examiner

HEADLIGHT LENS FOR A VEHICLE HEADLIGHT

CROSS REFERENCE TO RELATED APPLICATIONS

This application is a U.S. nationalization under 35 U.S.C. § 371 of International Application No. PCT/EP2013/003384, filed Nov. 10, 2013, which claims priority to German Application No. 102013001075.6, filed Jan. 23, 2013 and German Application No. 102013003324.1, filed Feb. 28, 2013.

FIELD OF THE INVENTION

The invention relates to a headlight lens for a vehicle headlight, in particular a motor vehicle headlight, wherein the headlight lens incorporates a monolithic body of transparent material including at least one light entry face and at least one optically effective light exit face.

BACKGROUND INFORMATION

WO 2012/072 188 A1 discloses a headlight lens for a motor vehicle headlight, wherein the headlight lens includes a body of transparent material incorporating at least one (particularly optically effective) light entry face and at least one optically effective light exit face, and wherein the body comprises a light tunnel forming, via a bend, transition into the light passage section for imaging the bend as a bright-dark boundary.

SUMMARY

According to an aspect of the invention a headlight lens for a vehicle headlight, e.g. a motor vehicle headlight, comprises an optionally press-molded, e.g. monolithic body of transparent material, wherein the body comprises at least one light tunnel and one light passage section including at least one optically effective light exit face, wherein the light tunnel comprises at least one optionally optically effective light entry face and, via a bend, forms transition into the light passage section for imaging the bend as a bright-dark boundary via light irradiated into or made to enter, respectively, the light entry face, and wherein the (sur-)face restricting the light tunnel optionally upwardly incorporates an indentation which extends (essentially) in the transversal direction (of the light tunnel) and/or at least partially orthogonally with respect to the optical axis of the light tunnel and/or at least partially orthogonally with respect to the optical axis of the light passage section and/or at least partially orthogonally with respect to the optical axis of the light exit face. In the sense of the claims, the transversal indentations 190 and 290 are to be understood as examples of embodiment/configuration of indentations (notches).

An optically effective (operative) light entry (sur-) face and/or an optically effective light exit (sur-) face, respectively, is an optically effective surface of the monolithic body. In the sense of the invention, an optically operative (sur-)face is, in particular, a surface of the transparent body, at which surface, when using the headlight lens according to its purpose, light will be refracted. In the sense of the invention, an optically effective surface is, in particular, a surface at which, when using the headlight lens according to its purpose, the direction of light passing through this surface will be changed.

Transparent material is for example glass. Transparent material is optionally inorganic glass. Transparent material is optionally silicate glass. Transparent material is optionally glass as described in PCT/EP2008/010136. Glass optionally comprises
  0.2 to 2% by weight $Al_2O_3$,
  0.1 to 1% by weight $Li_2O$,
  0.3, for example 0.4 to 1.5% by weight $Sb_2O_3$,
  60 to 75% by weight $SiO_2$,
  3 to 12% by weight $Na_2O$,
  3 to 12% by weight $K_2O$, and
  3 to 12% by weight $CaO$.

The term press-molding is, in particular, to be understood in a manner that an optically effective surface is to be (injection-) molded under pressure such that any subsequent finishing or post-treatment of the contour of this optically effective face may be dispensed with or does not apply or will not have to be provided for, respectively. Consequently, it is particularly provided for that, after press-molding, the press-molded surface need not be ground, (i.e. it does not [have to] be treated by grinding).

A light tunnel is, in particular, characterized in that essentially total reflection takes place at its lateral (in particular top, bottom, right and/or left) surfaces, so that light entering through the light entry face is conducted through the tunnel acting as a light guide (conductor). A light tunnel is in particular a light guide or light conductor. In particular, it is provided for that total reflection occurs at the longitudinal surfaces of the light tunnel. In particular, it is provided for that the longitudinal surfaces of the light tunnel are intended for total reflection. In particular, it is provided for that total reflection is achieved at, on or via the surfaces of the light tunnel essentially oriented in the direction of the optical axis of the light tunnel. In particular, it is provided for that the surfaces of the light tunnel essentially orientated in the direction of the optical axis of the light tunnel are destined for total reflection. A light tunnel optionally tapers in the direction of its light entry face.

A bend is, in particular, a curved transition. A bend is, for example, a curved transition having a radius of curvature of no less than 50 nm. For example, it is provided for that the surface of the headlight lens has no break or discontinuity in the bend, but is rather configured as a curve or is curvature shaped. For example, it is provided for that the surface of the headlight lens in the bend has a curvature including, for example, a radius of curvature of the curve in the bend of no less than 50 nm. In an embodiment the radius of curvature is no larger than 5 mm. In an embodiment or configuration the radius of curvature is no more than 0.25 mm, for example no more than 0.15 mm, optionally no more than 0.1 mm. In a further embodiment of the invention, the radius of curvature of the curve in the bend is at least 0.05 mm. For example, it is provided for that the surface of the headlight lens is press-molded in the region of the bend.

In a further embodiment of the invention, the light tunnel is arranged between the bend and the light entry face. In a further embodiment of the invention, the light passage section is arranged between the bend and the light exit face. It is, for example, provided for that light entering the transparent body through the light entry face and entering the light passage section from the light tunnel in the region of the bend, will exit from the light exit face at an angle of between −30° and 30° with respect to the optical axis. It is, for example, provided for that light entering the transparent body through the light entry face will exit from the light exit face at an angle of between −30° and 30° with respect to the optical axis. It is, for example, provided for that light entering the transparent body through the light entry face and, from the light tunnel, entering the passage section in the area of the bend, will exit from the light exit face essentially in parallel with respect to the optical axis. It is, for example, provided for that light entering the transparent body through the light entry face, will exit from the light exit face essentially in parallel with respect to the optical axis.

In a further embodiment of the invention, the bend includes an opening angle of at least 90°. In a further embodiment of the invention, the bend includes an opening angle of no more than 150°. In a further favourable embodiment of the invention, the bend is arranged on a surface of the light passage section, which surface is facing the light entry face.

In a further embodiment of the invention, the orthogonal of the light entry face is inclined with respect to the optical axis of the light passage section. In a further embodiment of the invention, the light entry face is inclined, with respect to the optical axis of the light passage section, by an angle of between 5° and 70°, for example by an angle of between 20° and 50°, for example by an angle of approximately 45°.

In a further embodiment of the invention, the surface of the light passage section facing the light tunnel is curved at least in the region of the bend towards the transition into the light tunnel, the curvature being, for example, convexly configured. In a further embodiment of the invention, the bend is curved in its longitudinal extension. In a further embodiment of the invention, the bend is curved in its longitudinal extension, the bend having a radius of curvature of between 5 mm and 100 mm. In a still further embodiment of the invention, the bend is curved, in its longitudinal extension, the curvature corresponding to a Petzval curve.

In a further embodiment of the invention, the bend comprises, in its longitudinal extension, a curvature having a radius of curvature in the orientation of the optical axis of the light tunnel and/or of the light passage section. In a yet further preferred embodiment of the invention, the radius of curvature is orientated opposite to the light exit face.

In a further embodiment of the invention, the bend is curved in a first direction and in a second direction. In a further embodiment of the invention, the first direction is orthogonal with respect to the second direction. In a still further embodiment of the invention, the bend is curved with a first radius of curvature in a first direction and with a second radius of curvature in a second direction, wherein the second radius of curvature is orthogonal with respect to the first radius of curvature.

In a further embodiment, a portion of the surface of the light passage section facing the light tunnel is configured as a Petzval (sur)face. In a yet further embodiment of the invention, the surface of the light passage section facing the light tunnel is configured as a Petzval face in a region in which it transits into the light tunnel.

In a further embodiment of the invention the length of the headlight lens, when viewed in the orientation of the optical axis of the light tunnel and/or of the light passage section, amounts to no more than 7 cm.

In a further embodiment of the invention, the light tunnel comprises a region on its surface between the light entry face and the indentation, which region corresponds (essentially) to a portion of the surface of an ellipsoid, wherein it is, in particular, provided for that the indentation includes a flank which is part of the region corresponding to the surface of an ellipsoid. A respective region has, for example, to be considered to lie between a light entry face and an indentation when the light entry face and the indentation lie or are arranged, respectively, on opposing sides of that region. It is, for example, provided for that the aforementioned region extends from the light entry face up to the indentation.

In an embodiment of the invention, the surface of the light passage section comprises a concavely curved region. In an embodiment of the invention, the concavely curved region is arranged between the light exit face and a surface of the light passage section facing the light tunnel. In an embodiment of the invention, the concavely curved region is configured to have the shape of a channel or groove, wherein it is, for example, provided for that the bottom of the channel extends in the direction of the optical axis of the light passage section or of the optical axis of the light exit face, with one component, and/or that the bottom of the channel extends in a direction which is defined to run from the surface facing the light tunnel up to the light exit face. In an embodiment of the invention, the bottom of the channel extends from the surface facing the light tunnel up to the light exit face. In an embodiment of the invention, the concavely curved region is arranged on a surface of the light passage section restricting the light passage section upwardly (i. e. in an upward direction) and/or on a surface of the light passage section restricting the light passage section downwardly (i. e. in a downward direction).

In one embodiment of the invention, the surface of the light passage section comprises at least one indentation, which extends from the surface facing the light tunnel up to the light exit face. In one embodiment of the invention, the extension of the cross-section of the indentation amounts to no more than 1 cm.

According to another aspect of the invention a headlight lens for a vehicle headlight (headlamp), for example for a motor vehicle headlight, comprises, in particular, at least one or several of the aforementioned features, wherein the headlight lens includes a optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, forms transition into the light passage section for imaging the bend as a bright-dark boundary via light irradiated into or made to enter, respectively, the light entry face, wherein the (sur-)face restricting the light tunnel optionally upwardly incorporates an indentation, and wherein the light tunnel, between the light entry face and the indentation, comprises a region on its optionally upwardly restricting surface which (essentially) corresponds to a portion of the surface of an ellipsoid, and wherein it is, in particular, provided for that the indentation includes a flank which is a portion of the region corresponding to the surface of an ellipsoid. It is, for example, provided for that the aforementioned region extends from the light entry face up to the indentation.

In a further embodiment of the invention the light tunnel includes at least two, in particular at least three longitudinal segments with their extensions starting from the light entry face. Herein, it is, for example, provided for that the longitudinal segments or a part of the longitudinal segments extend/s from the light entry face up to the indentation.

According to another aspect of the invention a headlight lens for a vehicle headlight (headlamp), in particular for a motor vehicle headlight, comprises at least one or several of the aforementioned features, wherein the headlight lens incorporates a optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, forms a transition into the light passage section for imaging the bend as a bright-dark boundary via light made to enter or irradiated, respectively, into the light entry face, wherein the (sur-)face restricting the light tunnel optionally upwardly incorporates an indentation, and wherein the light tunnel, on its surface between the light entry face and the indentation, includes at least two, in particular at least three longitudinal segments with their extensions starting from the light entry face.

In the sense of the invention, a longitudinal segment includes, in particular, a longitudinal side and a narrow side (which is shorter than the longitudinal side), wherein it is, in particular, provided for that the longitudinal side essentially extends in the direction of the optical axis or at least at an angle of less than 30° with respect to the optical axis of the light tunnel. It is, for example, provided for that, herein, a narrow side of the longitudinal segment extends transversally with respect to the light tunnel.

In a further embodiment of the invention, the light tunnel comprises a cross-sectional face between the light entry face and the indentation, which cross-sectional face is larger than the cross-sectional face of the light tunnel in the region of the indentation.

According to another aspect of the invention a headlight lens for a vehicle headlight (headlamp), for example for a motor vehicle headlight, comprises at least one or several of the aforementioned features, wherein the headlight lens incorporates a optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, forms transition into the light passage section for imaging the bend as a bright-dark boundary via light irradiated into or made to enter, respectively, the light entry face, and wherein the light tunnel comprises a first cross-sectional face and a second cross-sectional face positioned between the first cross-sectional face and the bend, which second cross-sectional face is larger than the first cross-sectional face.

According to another aspect of the invention a headlight lens for a vehicle headlight (headlamp), for example for a motor vehicle headlight, comprises at least one or several of the aforementioned features, wherein the headlight lens incorporates a optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, transits into the light passage section for imaging the bend as a bright-dark boundary via light irradiated into or made to enter, respectively, the light entry face, and wherein the light tunnel comprises an area in which the light tunnel tapers in the direction towards the bend.

According to another aspect of the invention a headlight lens for a vehicle headlight (headlamp), for example for a motor vehicle headlight, comprises at least one or several of the aforementioned features, wherein the headlight lens incorporates a optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, forms transition into the light passage section for imaging the bend as a bright-dark boundary via light made to enter or irradiated, respectively, into the light entry face, and wherein the light tunnel includes at least two, in particular at least three longitudinal segments with their extensions starting from the light entry face.

In a further embodiment of the invention, at least two of the longitudinal segments comprise an area or region on their surfaces which essentially corresponds to a portion of the surface of an ellipsoid. Herein, it can be provided for that the axes of the ellipsoids are parallel (to each other). In a further embodiment of the invention, at least two ellipsoids include differing distances of their focal lengths. In the sense of the invention, the axis of an ellipsoid is a straight line through the focal points thereof. In the sense of the invention, the focal points of the ellipsoid are the focuses thereof. The points designated F1 and F2 in FIG. 9 and FIG. 10 are examples for showing the focal points of an ellipsoid.

In a further embodiment of the invention, at least three longitudinal segments comprise a region on their surface, which essentially corresponds to a portion of the surface of an ellipsoid. Herein, it may be provided for that an ellipsoid of an outer longitudinal segment has a distance of the focal length, which is (by $\delta$%) larger than the distance of the focal length of an ellipsoid of an inner longitudinal segment. In a further embodiment of the invention, $\delta$ is no smaller than 1. In a yet further embodiment of the invention, $\delta$ is no larger than 10, for example not larger than 5. In the sense of the invention, a distance of the focal length is for example the distance of the two focal points of an ellipsoid.

It can be provided for that the axes of the ellipsoids have different inclinations with regard to the horizontal plane. It can be provided for that the axes of the ellipsoids are aligned asymmetrically with respect to the optical axis of the light tunnel. It can be provided for that the axes of the ellipsoids have different distances with regard to the optical axis of the light tunnel in a plane which is orthogonal to the optical axis of the light tunnel. The distances designated dx1 and dx2 as shown in FIG. 12 are examples of embodiment of such difference in distances.

According to another aspect of the invention a headlight lens for a vehicle headlight (headlamp), for example for a motor vehicle headlight, comprises at least one or several of the aforementioned features, wherein the headlight lens incorporates a particularly optionally press-molded, for example monolithic body of transparent material, wherein the optionally monolithic body comprises at least one light tunnel and one light passage section including at least one optically effective light exit face, wherein the light tunnel comprises at least one optionally optically effective light entry face and, via a bend, forms transition into the light passage section for imaging the bend as a bright-dark boundary via light irradiated into or made to enter, respectively, the light entry face, and wherein the surface of the light passage section comprises a concavely curved region (area) and/or at least one indentation, which extends from the surface facing the light tunnel up to the light exit face.

In an embodiment of the invention, the concavely curved region is arranged between the light exit face and a surface of the light passage section facing the light tunnel. In an embodiment of the invention, the concavely curved region is configured in the shape of a channel or groove, wherein it is, for example, provided for that the bottom of the channel, with one component, extends in the direction of the optical axis of the light passage section or of the optical axis of the light exit face, and/or that the bottom of the groove extents in a direction which extends from the surface facing the light tunnel up to the light exit face. In an embodiment of the invention, the bottom of the channel or groove extents from the surface facing the light tunnel up to the light exit face. In an embodiment of the invention, the concavely curved region is provided on a surface of the light passage section restricting the light passage section upwardly, and/or on a surface of the light passage section restricting the light passage section downwardly. In an embodiment of the invention, the extension of the cross section of the indentation amounts to no more than 1 cm.

According to another aspect of the invention a vehicle headlight (headlamp), for example a motor vehicle headlight, includes a headlight lens—comprising one or several of the aforementioned features—as well as a light source for making light enter the light entry face. In an embodiment of the invention, the light source comprises at least one LED or an array of LEDs. In an embodiment of the invention, the light source comprises at least one OLED or an array of OLEDs. For example, the light source may well be a planar luminous field. The light source may also comprise light element chips as have been disclosed in DE 103 15 131 A1. A light source may as well be a laser. A suitable laser is disclosed in ISAL 2011 Proceedings, pages 271ff.

In a further embodiment of the invention the vehicle, headlight has no secondary optic associated with the headlight lens. A secondary optic is, for example, an optic means for aligning light which exits from the light exit face or from the last light exit face of the headlight lens, respectively. A secondary optic is, in particular, an optical element for aligning light, which optical element is separated from and/or subordinated with regard to the headlight lens. A secondary optic is, in particular, no cover nor a protection disc, respectively, but an optical element provided for aligning light. An example of a secondary optic is e.g. a secondary lens as disclosed in DE 10 2004 043 706 A1.

In particular, it is provided for that the bend which is imaged as a bright-dark boundary lies in the lower region of the light tunnel.

In a yet further embodiment of the invention the distance of the light source from the centre of the light exit face, when viewed in the orientation of the optical axis of the light tunnel and/or of the light passage section amounts to no more than 10 cm. In a further embodiment of the invention the length of the vehicle headlight, when viewed in the orientation of the optical axis of the light tunnel and/or of the light passage section amounts to no more than 10 cm.

One or several further light sources may be provided for whose light is irradiated into or made to enter, respectively, the passage section and/or a part of the light tunnel, for implementing sign light, long distance light, and/or cornering light. When making such additional light enter the light tunnel it is, for example, provided for that this occurs in that half of the light tunnel which is closer to the light passage section and/or in which the light entry face is not arranged. For example, additional light source arrays may be provided for as are described or claimed, respectively, in WO 2012/072192 A1. For example, additional light source arrays are specified in FIGS. 10, 14, 15, 18, 19, 20, and 21 of WO 2012/072192 A1. For example, the headlight lens according to the invention may be used in arrays having optical axes inclined with respect to each other, as is disclosed (or claimed, respectively), for example, in WO 2012/072193 A2, optionally in FIG. 24 of WO 2012/072193 A2. Moreover, or alternatively, it may be provided for that the headlight lens will be made use of in vehicle configurations as are disclosed or claimed, respectively, in WO 2012/072191 A2.

In a further embodiment of the invention, the light source and the (first)) light entry face are configured and arranged with respect to each other such that light from the light source enters the light entry face at a luminous flux density of at least 75 lm/mm$^2$.

The aforementioned headlight lenses may be manufactured in accordance with a process as is described in WO 2012/072188 A1.

It can be provided for that a light entry face and/or a light exit face has/have a light dispersing structure. A light dispersing structure may, for example, be a structure as is disclosed in DE 10 2005 009 556 A1 and in EP 1 514 148 A1 or in EP 1 514 148 B1, respectively. In the sense of the invention, a light dispersing structure may, for example, comprise a microstructure or a microstructure (specifically) in the shape of a grate, pattern or grid, or a periodical microstructure, or a grid-shaped periodical microstructure, respectively. For example, DE 10 2008 023 551 A1 discloses an appropriate microstructure. There may also be provided a microstructure including a sinusoidal component extending in a first direction and having a first wavelength, as well as including a sinusoidal component extending in a second direction (inclined with respect to the first direction) and having a second wavelength, wherein the first direction extends, for example, orthogonally with respect to the second direction, and wherein the first wavelength is a (optionally continuous or steady) function of a coordinate in the first direction and/or of the absolute value thereof, and/or the second wavelength is a (optionally continuous or steady) function of a coordinate in the second direction and/or of the absolute value thereof. In the sense of the invention, a microstructure is, for example, a structure having an extension or amplitude, respectively, in the optionally single-digit range of micro metres.

It can be provided for that the light entry face comprises a first segment and at least one second segment (separated from the first segment by an indentation), wherein the light exit face comprises, in the region of the first segment, a first light dispersing structure, and, in the region of the second segment, a second light dispersing structure, wherein the first light dispersing structure expediently differs from the second light dispersing structure.

According to another aspect of the invention a headlight lens for a vehicle headlight (headlamp), for example a motor vehicle headlight, comprises at least one or several of the aforementioned features, wherein the headlight lens incorporates a optionally press-molded, for example monolithic body of transparent material and including at least one light tunnel and one light passage section including at least one optically effective light exit face, wherein the light tunnel comprises at least one optionally optically effective light entry face and, via a bend, forms transition into the light passage section for imaging the bend as a bright-dark boundary (via light made to enter or irradiated, respectively, into the light entry face), and wherein the light exit face comprises a first segment and at least one second segment (separated from the first segment by an indentation), wherein the light exit face, in the region of the first segment, comprises a first light dispersing structure and, in the region of the second segment, a second light dispersing structure, wherein the first light dispersing structure expediently differs from the second light dispersing structure.

It can be provided for that a light tunnel is coated. It can be provided for that a light tunnel is coated with a reflecting coating. It can be provided for that a mirroring coating is applied to a light tunnel in the sense of the invention.

The invention provides for an improved headlight lens for a vehicle headlight, in particular for a motor vehicle headlight. The invention provides for improved illumination achieved via vehicle headlights.

In the sense of the invention, a motor vehicle is, in particular, a land vehicle for individual use in road traffic. In the sense of the invention, motor vehicles are, in particular, not restricted to land vehicles including a combustion engine.

DETAILED DESCRIPTION

Figure 1:
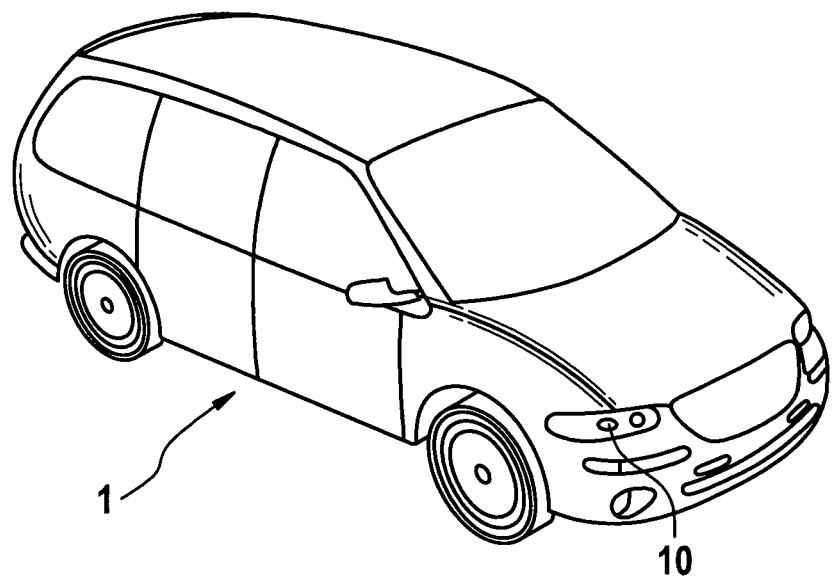
FIG. 1 shows an example of an embodiment of a motor vehicle.
Figure 2:
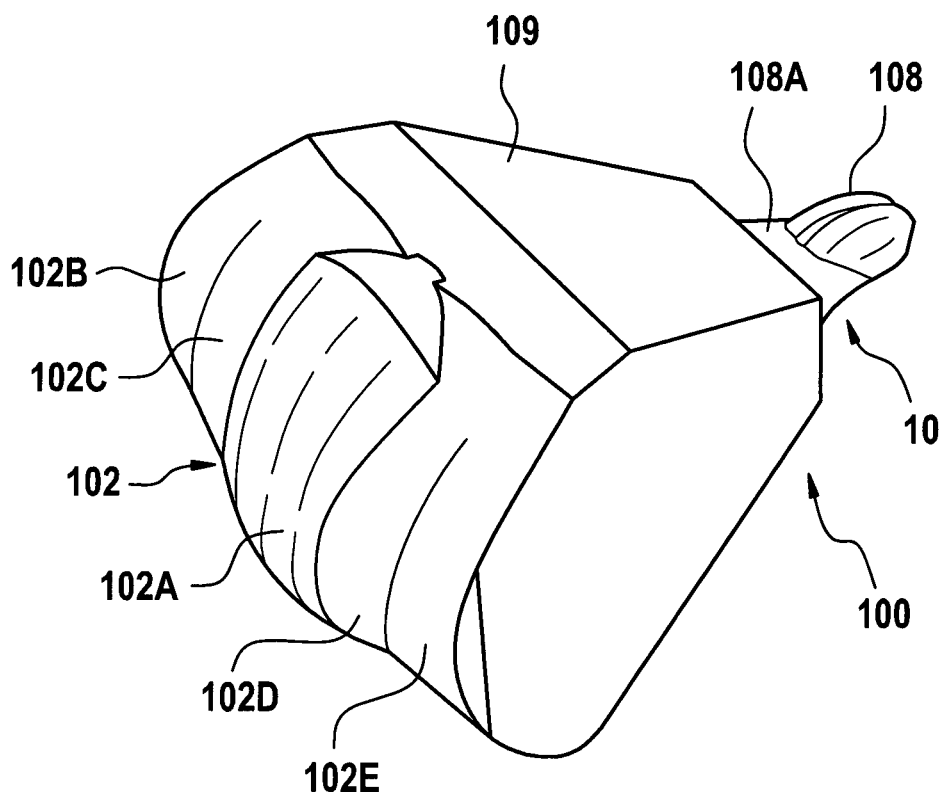
FIG. 2 shows an example of embodiment of a motor vehicle headlamp for implementation in the motor vehicle according to FIG. 1.

FIG. 1 shows an example of embodiment of a motor vehicle 1 including a motor vehicle headlight 10. FIG. 2 shows the motor vehicle headlight 10 including a headlight lens 100 by way of an inclined top view, but without any housing, fittings and energy supply means, with the headlight lens 100 shown in FIG. 3 by way of a side view, however, also without any housing, fittings and energy supply means. The headlight lens 100 comprises a press-molded monolithic body made from inorganic glass, for example glass comprising 0.2 to 2% by weight $Al_2O_3$,
0.1 to 1% by weight $Li_2O$,
0.3, for example 0.4, to 1.5% by weight $Sb_2O_3$,
60 to 75% by weight $SiO_2$,
3 to 12% by weight $Na_2O$,
3 to 12% by weight $K_2O$, and
3 to 12% by weight $CaO$.

Figure 4:
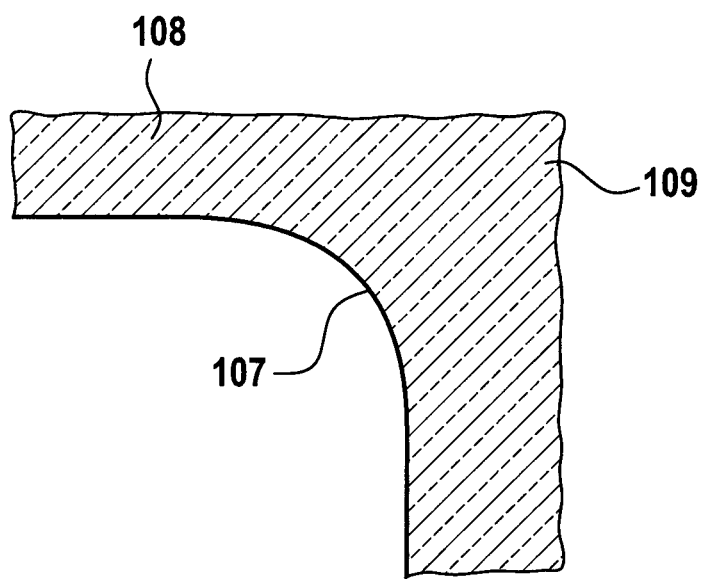
FIG. 4 shows an enlarged representation of a cut-out cross section of a bend for the transition of a light tunnel into a passage section of a headlight lens according to FIG. 3.
Figure 5:
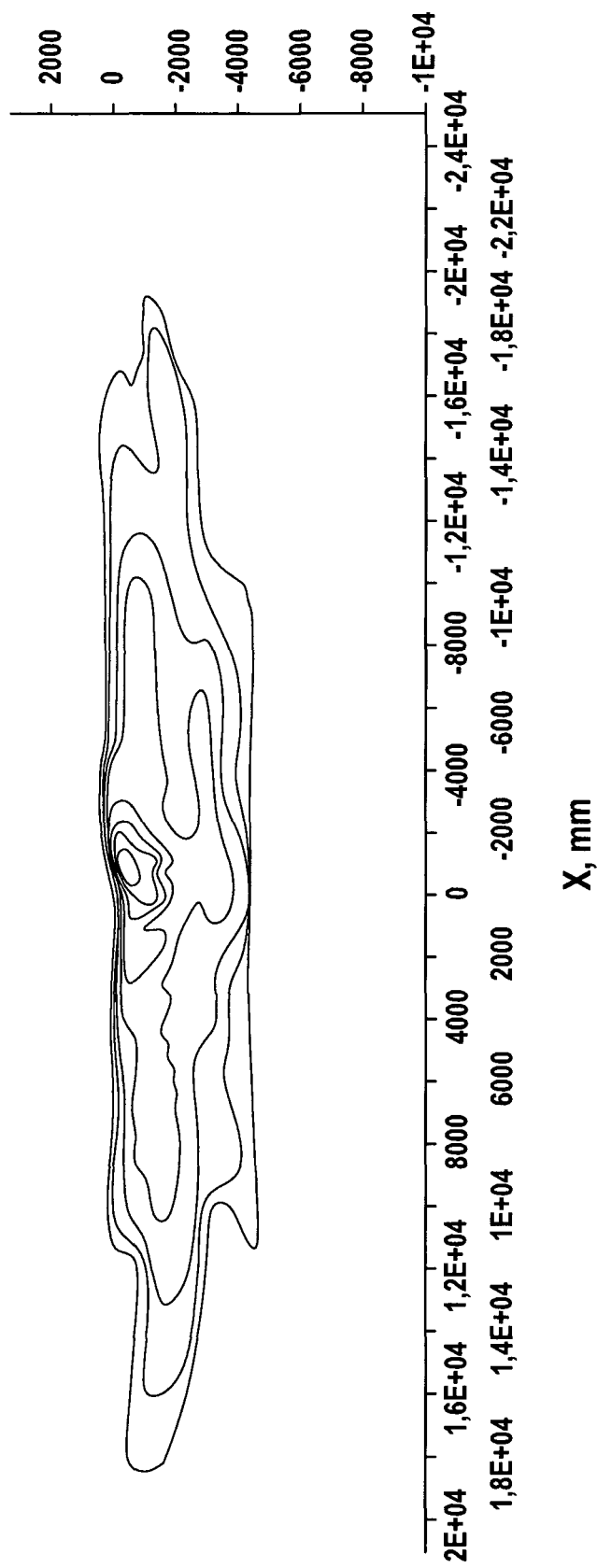
FIG. 5 shows a bright-dark boundary generated via the headlight lens according to FIG. 3.

The bright-molded monolithic body comprises a light tunnel 108, which, on its one side, includes a light entry face 101 and, on another side, forms transition into a light passage section 109 (of the bright- or press-molded monolithic body) via a bend 107, which section 109 has a segmented light exit face 102, whose segments are designated by reference numerals 102 A, 102 B, 102 C, 102 D and 102 E. The headlight lens 100 is configured such that light entering the headlight lens 100 through the light entry face 101 and, in the region of the bend 107, entering the light passage section from the light tunnel 108, will exit from the light exit face 102 essentially in parallel to the optical axis of the headlight lens 100. Herein, the light passage section 109 images the bend 107 as a bright-dark boundary, as has been represented in FIG. 5, wherein, for implementing a dimmed light, via the light source 11, configured as an LED, light is irradiated into or made to enter, respectively, the light entry face 101 of the light tunnel 108. The light tunnel 108 has a transition region 108 A, in which the surface restricting the light tunnel upwardly rises in the direction of the light passage section 109, and in which (transition region 108 A) the surface restricting the light tunnel 108 downwardly extents approximately horizontally or in parallel, respectively, with respect to the optical axis of the headlight lens 100. The motor vehicle headlight 10 may be supplemented by further light sources, as disclosed in WO 2012/072188 A1 and WO 2012/072192 A1. Thus, light can be made to enter or irradiated into, respectively, a bottom side of the light tunnel 108 of the surface of the light passage section 109 facing the light tunnel 108., which can be achieved, for example, via a light source selectively connectable for implementing a sign light or a driving light (in literature of the art also termed upper beam, high beam light, long distance light or main light). corresponding to the light source 12 as disclosed in WO 2012/072188 A1. By way of an enlarged representation, FIG. 4 shows a cut-out of the bend 107 for transition of the light tunnel 108 into the light passage section 109. The bend 107 is being formed by press- or bright-molding and is configured in the manner of a continuous, curved transition.

Figure 6:
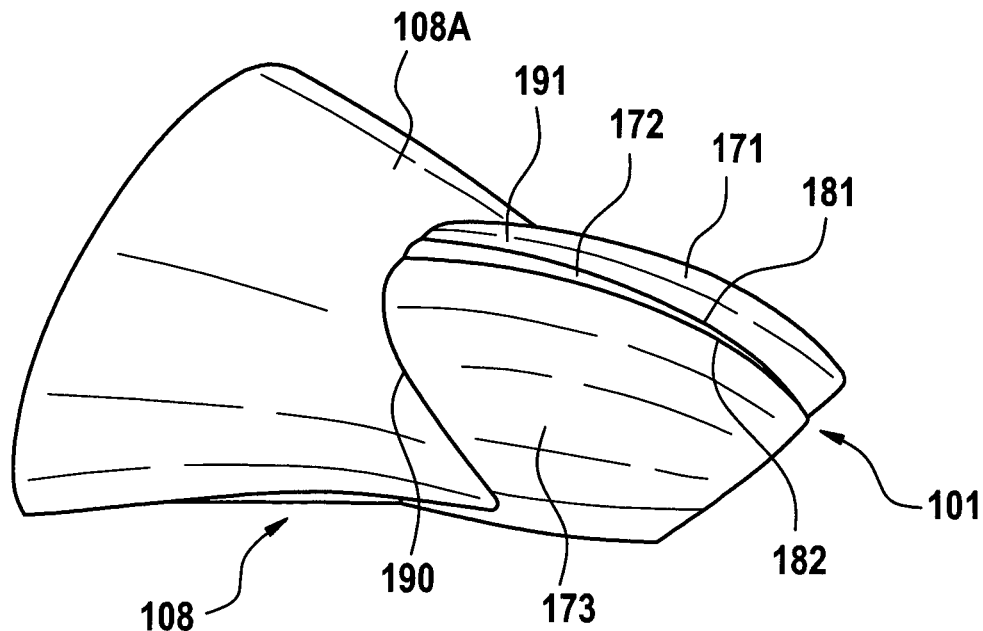
FIG. 6 shows an enlarged representation of the light tunnel of the headlight lens according to FIG. 3, by way of a skewed top view.
Figure 7:
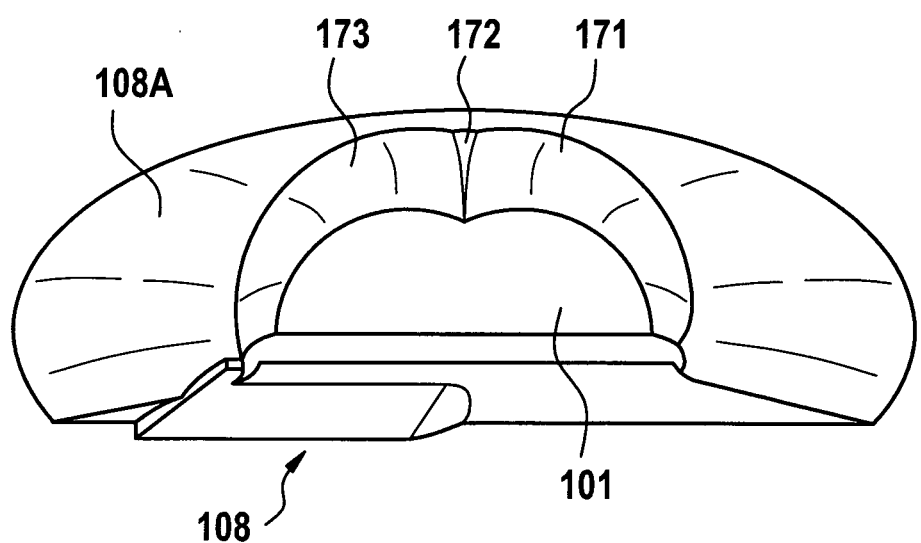
FIG. 7 shows the light tunnel according to FIG. 6, by way of a rear view.

FIG. 6 and FIG. 7 show an enlarged representation of the light tunnel 108, wherein FIG. 6 shows the light tunnel by way of a skewed top view and FIG. 7 shows the light tunnel 108 by way of a rear view. In its rearward area, the light tunnel 108 includes two longitudinal indentations 181 and 182 on its upwardly restricting surface, which indentations extend essentially in the longitudinal direction of the light tunnel 108, or essentially in parallel to the optical axis of the light tunnel 108, or essentially in parallel to the optical axis of the light passage section 109, or essentially in parallel to the optical axis of the light exit face 102, respectively. In this portion the light tunnel 108 comprises three segments 171, 172, and 173, orientated in its longitudinal direction and termed longitudinal segments in the following, which are configured or separated respectively, by the longitudinal indentations 181 and 182. The longitudinal segments 171 and 173 of the light tunnel 108 start at the light entry face 101 and extend up to the transversal indentation 190, which marks the transition into the transitional area 108A. The longitudinal segments 171, 172, and 173, on their upper sides, comprise a surface which essentially corresponds to a part of the surface of an ellipsoid. Herein, the upper sides of the segments 171, 172, and 173 are completely configured as ellipsoids, so that the ellipsoidal configuration extends up to the transversal indentation 190. Herein, the flank 191 of the indentation 190 on the longitudinal segment side is also configured in the manner of an ellipsoid.

Figure 8:
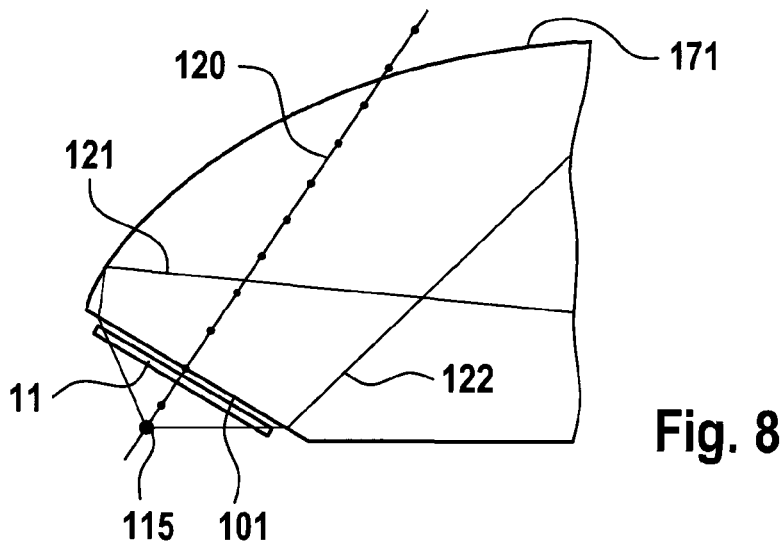
FIG. 8 shows a cut-out representation of a light tunnel of the headlight lens of FIG. 3, by way of a side view.
Figure 9:
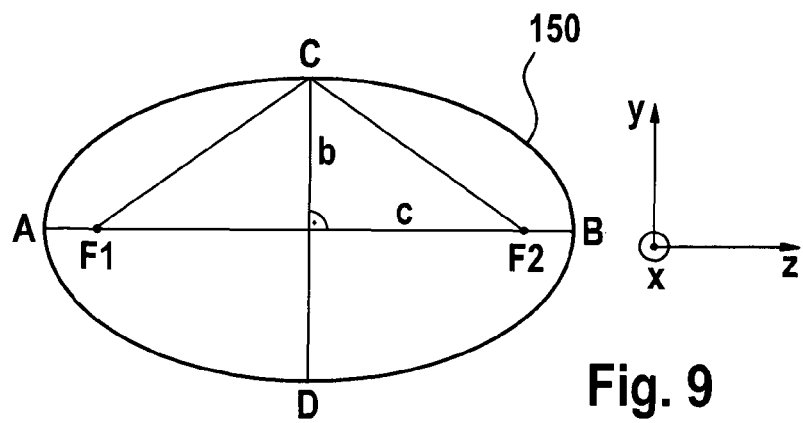
FIG. 9 shows an example of embodiment of an ellipsoid.
Figure 10:
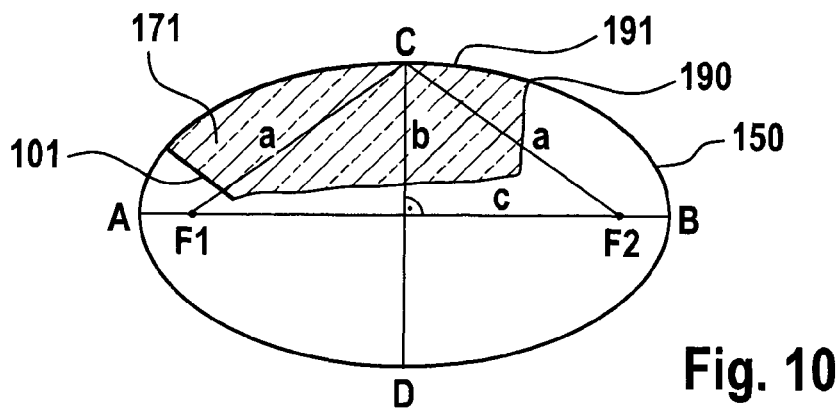
FIG. 10 shows the ellipsoid according to FIG. 7 with a superimposing representation of a portion of the light tunnel represented in FIG. 6, by way of a cross sectional representation.

FIG. 8 shows an enlarged cut-out representation of a part of the light tunnel 108, which part corresponds to the longitudinal segment 171. The upper portion of the part of the light tunnel 108 as shown in FIG. 8 is configured as an ellipsoid 150, as represented in FIG. 9. For illustrating this configuration even more clearly, a part of the cross-section of the longitudinal segment 171 is shown in FIG. 10 in a manner superimposing (overlaying) the representation of the ellipsoid 150. For the ellipsoid 150 as represented in FIG. 9 the following equation applies:

$$\frac{x^2}{a^2} + \frac{y^2}{b^2} + \frac{z^2}{c^2} - 1 = 0$$

In this equation
z is a coordinate in the direction of the optical axis of the light tunnel (A→B);
x is a coordinate orthogonal with respect to the direction of the optical axis of the light tunnel; and
y is a coordinate orthogonal with respect to the direction of the optical axis of the light tunnel and to the x-direction (D→C).
a, b, and, consequently, c have been chosen such that all beams (or rays) of light which pass through focus F1 will concentrate and accumulate again in focus F2 after mirroring in the surface of the ellipsoid. The light beams 121 and 122 depicted in FIG. 8 illustrate the course of the beams of light from the light source 11, which light is irradiated into or made to enter, respectively, the light entry face 101. Reference numeral 120 of FIG. 8 designates the orthogonal of the light entry face 101. Reference numeral 115 designates the mutual point of intersection of the orthogonal 120 of the light entry face 101 with the light beams 121 and 122. The position of this point of intersection 115 corresponds to focus F1 in FIG. 9 and FIG. 10.

Figure 11:
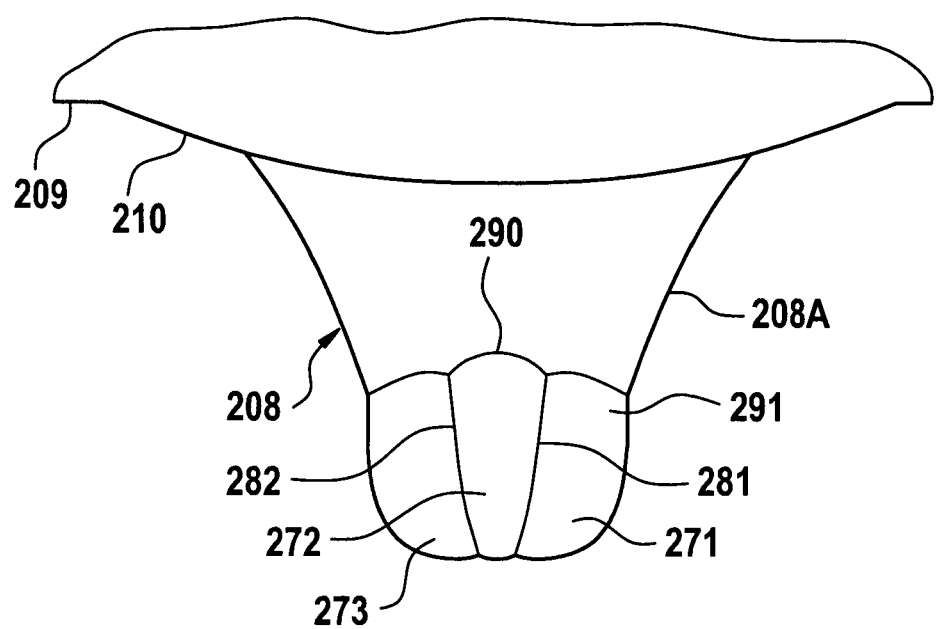
FIG. 11 shows a light tunnel configured alternatively with respect to the light tunnel according to FIG. 6.

FIG. 11 shows a top view of a light tunnel 208 configured alternatively for use as an alternative with respect to the light tunnel 108. In the example of embodiment as represented, the alternatively configured light passage section 209, moreover, substitutes the light passage section 109, said section 209, in the transitional area to the light tunnel 208, having a region configured as a Petzval face 210. The light tunnel 208 includes a transitional area 208A corresponding to the transitional area 108A. The rearward portion of the light tunnel 208 is segmented, wherein this rearward portion is separated from the transitional area 208A by an indentation 290. The rearward portion of the light tunnel 208 includes three longitudinal segments 271, 272, and 273, which are separated by longitudinal indentations 281 and 282. The longitudinal segments 271, 272, and 273 are formed/molded on the upper surface of the rearward portion of the light tunnel and extend, in a partly ellipsoidal shape from a light entry face (not recognisable in FIG. 11) up to the transversal indentation 290 such that the flank designated by reference numeral 291 is also configured as part of the ellipsoidal form of the longitudinal segments 271, 272, 273.

Figure 12:
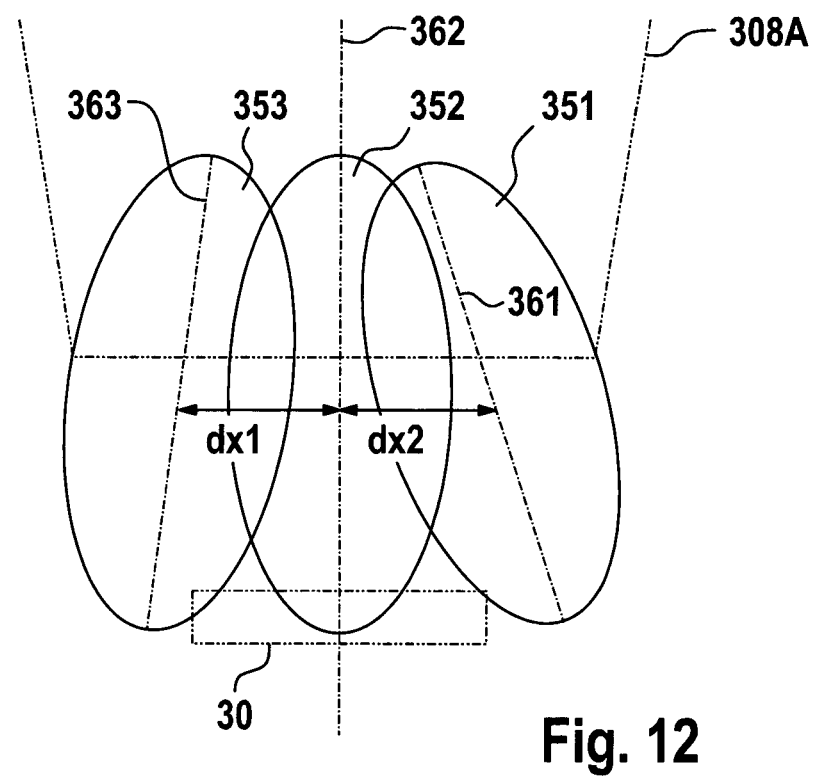
FIG. 12 shows an alignment of three ellipsoids as an example of embodiment for alternative arrangements of the longitudinal segments of the light tunnels according to FIG. 6 and FIG. 11.

The longitudinal segments 171, 172, and 173 of the light tunnel 108 or the longitudinal segments 271, 272, and 273 of the light tunnel 208, respectively, are configured as part of an ellipsoid such that the axes of these ellipsoids essentially extend in parallel. However, it may be provided for that the axes of the ellipsoids of the longitudinal segments 171, 172, and 173 or 271, 272, and 273, respectively, do not extend in parallel (i. e. are turned by different angles about the axis y represented in FIG. 9), as has been represented, purely by way of example, via ellipsoids 351, 352, and 353, in FIG. 12. As may be recognised from FIG. 12, the ellipsoid 351 is aligned such that its axis 361 intersects the axis 362 of the ellipsoid 352 as well as the axis 263 of the ellipsoid 253. The ellipsoid 253 is aligned such that its axis 263 not only intersects the axis 261 of the ellipsoid 351, but also the axis 362 of the ellipsoid 352.

Moreover, it may be provided for that the axes 361, 362, and 363 have differing inclinations with respect to the horizontal, i.e. that they are turned by differing angles about the axis x represented in FIG. 9. In this case, merely the projection of axis 361 onto the horizontal intersects the projection of axis 362 onto the horizontal and the projection of axis 263 onto the horizontal. Moreover, it may be provided for that merely the projection of axis 263 onto the horizontal intersects the projection of axis 362 onto the horizontal and the projection of axis 361 onto the horizontal. In this configuration, however, the axes 361, 362, and 363 normally do not intersect with themselves. Moreover, it may be provided for that the ellipsoids 351, 352, and 353 are arranged asymmetrically in the sense of the distances dx1 and dx2, represented in FIG. 12 differing in size. The dash dotted line 308A symbolises the possible position of a transitional area. The dash dotted line 30 discloses the position of a possible light source. It may be provided for that the distances of the focal length of the ellipsoids 351 and 353 are by 1% to 10% larger than the distance of focal length of the ellipsoid 352.

It may be provided for that the longitudinal segments 171 and 271 are modified such that they are based on the ellipsoid 351. It may be provided for that the longitudinal segments 172 and 272 are modified such that they are based on the ellipsoid 352. It may be provided for that the longitudinal segments 173 and 273 are modified such that they are based on the ellipsoid 353.

Figure 13:
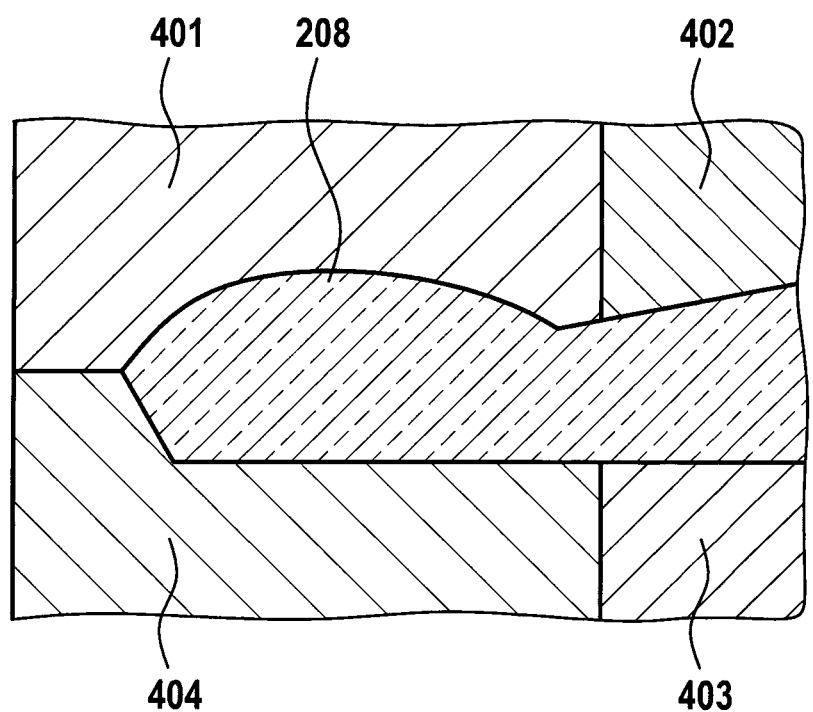
FIG. 13 shows an example of embodiment for a molding tool for press-molding of a headlight lens including a light tunnel according to FIG. 11.

FIG. 13 shows a possible molding tool for press-molding the headlight lens including the light tunnel 208. Herein, the reference numerals 401, 402, 403, and 404 designate partial molds suited for being moved relative to each other.

Figure 3:
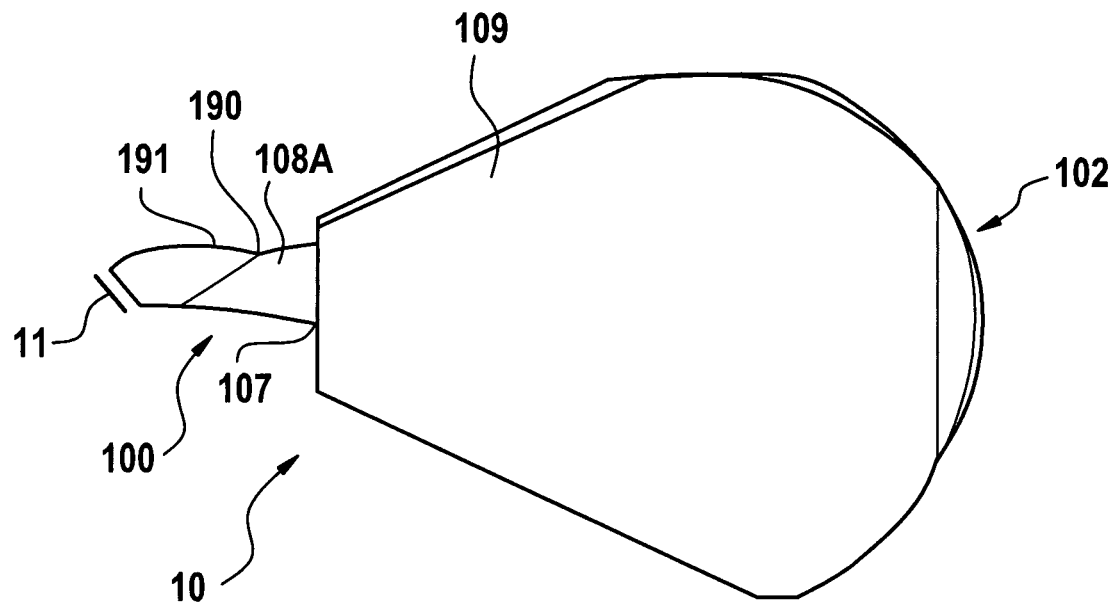
FIG. 3 shows the motor vehicle headlight according to FIG. 2, by way of a side view.
Figure 14:
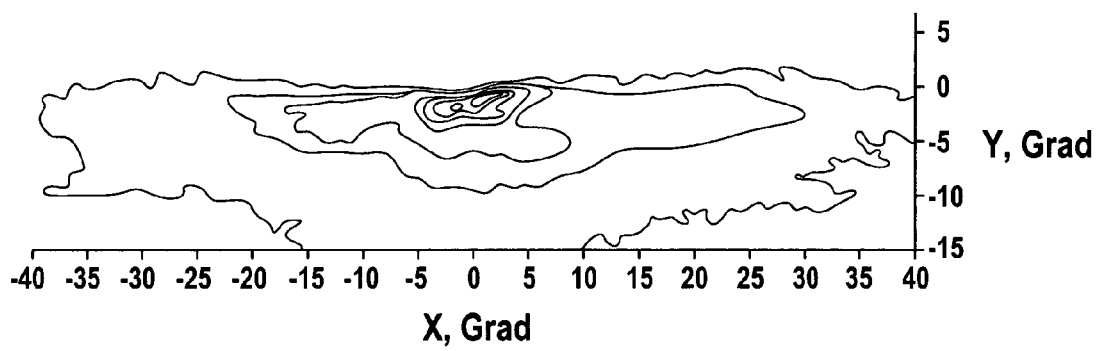
FIG. 14 shows a bright-dark boundary generated via the headlight lens according to FIG. 3 including a light tunnel according to FIG. 11.
Figure 15:
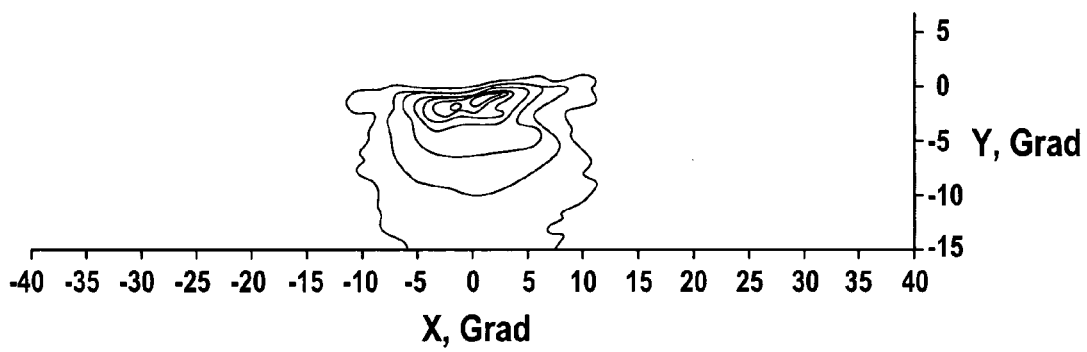
FIG. 15 shows a share in the light distribution according to FIG. 14.
Figure 16:
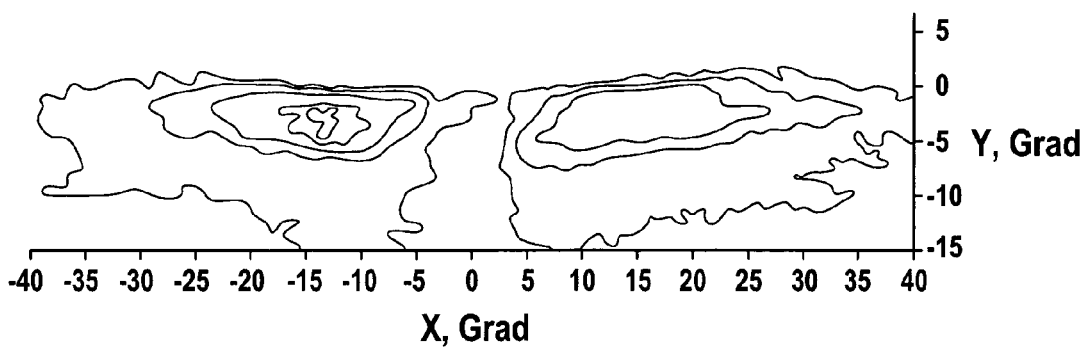
FIG. 16 shows a further share in the light distribution according to FIG. 14.

FIG. 14 shows a bright-dark boundary generated via the headlight lens 10 according to FIG. 3 and including a light tunnel 208 according to FIG. 11. FIG. 15 shows the share of the light in the light distribution according to FIG. 14, which light exits through the segment 102A, and FIG. 16 shows the share of the light in the light distribution according to FIG. 14, which light exits through the segments 102B, 102C, 102D, and 102E.

The invention claimed is:
1. A headlight lens for a vehicle headlight, the headlight lens including a body of transparent material, the body comprising:
   a light passage section having at least one optically effective light exit face, and
   a light tunnel having at least one light entry face, wherein the light tunnel, via a bend, transits into the light passage section configured for imaging the bend as a bright-dark-boundary via light irradiated into the light entry face, wherein the surface restricting the light tunnel upwardly incorporates an indentation, wherein the light tunnel, between the light entry face and the indentation, comprises a region on its upwardly restricting surface which essentially corresponds to part of the surface of an ellipsoid, and wherein the indentation includes a flank which is part of the region corresponding to the surface of an ellipsoid.

2. The headlight lens as claimed in claim 1, wherein the light tunnel includes at least two longitudinal segments, a longitudinal segment including a longitudinal side and a narrow side which is shorter than the longitudinal side.

3. The headlight lens as claimed in claim 1, wherein the light tunnel includes at least two longitudinal segments, with their extensions starting from the light entry face, a longitudinal segment including a longitudinal side and a narrow side which is shorter than the longitudinal side.

4. The headlight lens as claimed in claim 3, wherein the narrow side of the longitudinal segment extends transversally with respect to the light tunnel.

5. The headlight lens as claimed in claim 4, wherein the longitudinal side essentially extends in the direction of an optical axis of the light tunnel.

6. The headlight lens as claimed in claim 4, wherein the longitudinal side extends at an angle of less than 30° with respect to an optical axis of the light tunnel.

7. The headlight lens as claimed in claim 1, wherein the light tunnel includes at least three longitudinal segments, with their extensions starting from the light entry face, a longitudinal segment including a longitudinal side and a narrow side which is shorter than the longitudinal side.

8. The headlight lens as claimed in claim 1, wherein the light tunnel includes at least two longitudinal segments, starting from the light entry face and extending up to the transversal indentation.

9. The headlight lens as claimed in claim 1, wherein the body of transparent material is monolithic.

10. The headlight lens as claimed in claim 9, wherein the transparent material is inorganic glass.

11. The headlight lens as claimed in claim 10, the bend being a curved transition having a radius of curvature of at least 0.05 mm.

12. The headlight lens as claimed in claim 1, wherein the light tunnel includes at least three longitudinal segments, the segments comprising a region on their surface, which essentially corresponds to a portion of the surface of an ellipsoid.

13. The headlight lens as claimed in claim 12, wherein an ellipsoid of an outer longitudinal segment has a distance of the focal length, which is larger than the distance of the focal length of an ellipsoid of an inner longitudinal segment.

14. The headlight lens as claimed in claim 12, wherein an ellipsoid of an outer longitudinal segment has a distance of the focal length, which is by δ % larger than the distance of the focal length of an ellipsoid of an inner longitudinal segment, wherein δ is no smaller than 1.

15. The headlight lens as claimed in claim 14, wherein δ is no larger than 10.

16. The headlight lens as claimed in claim 14, wherein δ is no larger than 5.

17. The headlight lens as claimed in claim 12, wherein the axes of the ellipsoids have different inclinations with regard to a horizontal plane.

18. The headlight lens as claimed in claim 12, wherein the axes of the ellipsoids are aligned asymmetrically with respect to an optical axis of the light tunnel.

19. The headlight lens as claimed in claim 12, wherein the axes of the ellipsoids have different distances with regard to the optical axis of the light tunnel in a plane which is orthogonal to the optical axis of the light tunnel.

20. A headlight lens for a vehicle headlight, the headlight lens including a monolithic body of transparent material, the monolithic body comprising:
a light passage section having at least one optically effective light exit face, and
a light tunnel having at least one light entry face, wherein the light tunnel, via a bend. transits into the light passage section configured for imaging the bend as a bright-dark-boundary via light irradiated into the light entry face, wherein the surface restricting the light tunnel upwardly includes an indentation, wherein the light tunnel, on its surface between the light entry face and the indentation, includes at least three longitudinal segments with their extension starting from the light entry face and the segments comprising a region on their surface, which essentially corresponds to a portion of the surface of an ellipsoid, wherein an ellipsoid of an outer longitudinal segment has a distance of the focal length, which is larger than the distance of the focal length of an ellipsoid of an inner longitudinal segment.

21. The headlight lens as claimed in claim 20, wherein an ellipsoid of an outer longitudinal segment has a distance of the focal length, which is by δ % larger than the distance of the focal length of an ellipsoid of an inner longitudinal segment, wherein δ is no smaller than 1.

22. The headlight lens as claimed in claim 21, wherein δ is no larger than 10.

23. The headlight lens as claimed in claim 21, wherein δ is no larger than 5.

24. The headlight lens as claimed in claim 20, the axes of the ellipsoids have different inclinations with regard to the horizontal plane.

25. The headlight lens as claimed in claim 20, wherein the axes of the ellipsoids are aligned asymmetrically with respect to an optical axis of the light tunnel.

26. The headlight lens as claimed in claim 20, wherein the light exit face comprises a first segment and at least one second segment. wherein the light exit face comprises, in a region of the first segment, a first light dispersing structure, and, in a region of the second segment, a second light dispersing structure, wherein the first light dispersing structure differs from the second light dispersing structure.

27. A headlight lens for a vehicle headlight, the headlight lens including a body of transparent material, the body comprising:
a light passage section having at least one optically effective light exit face, and
a light tunnel having at least one light entry face, wherein the light tunnel, via a bend, transits into the light passage section configured for imaging the bend as a bright-dark-boundary via light irradiated into the light entry face, wherein the light exit face comprises a first segment and at least one second segment, wherein the light exit face comprises, in a region of the first segment, a first light dispersing structure, and, in a region of the second segment, a second light dispersing structure, wherein the first light dispersing structure differs from the second light dispersing structure.

* * * * *